United States Patent [19]

Burke et al.

[11] 4,244,922

[45] Jan. 13, 1981

[54] HOLD-DOWN DEVICE FOR VERTICALLY MOVABLE MEMBER IN APPARATUS WHICH CONTAINS CONTACT MATERIAL

[75] Inventors: Ben G. Burke, Lafayette; Douglas J. Legg, Menlo Park, both of Calif.

[73] Assignee: Chevron Research Company, San Francisco, Calif.

[21] Appl. No.: 939,765

[22] Filed: Sep. 5, 1978

[51] Int. Cl.² .............................................. B01J 8/02
[52] U.S. Cl. .................... 422/218; 422/192; 422/221; 422/311; 423/659; 208/146
[58] Field of Search ............... 422/179, 181, 192, 211, 422/218, 219, 212, 220, 221, 311; 423/659; 208/146; 52/155, 165

[56] References Cited

U.S. PATENT DOCUMENTS

| | | | |
|---|---|---|---|
| 631,168 | 8/1899 | Langston | 52/155 |
| 2,646,391 | 7/1953 | Houdry | 208/146 X |
| 2,997,374 | 8/1961 | Lavender et al. | 422/218 |
| 3,027,244 | 3/1962 | Byrne et al. | 422/218 |
| 3,167,399 | 1/1965 | Hansen, Jr. | 422/218 X |
| 3,533,754 | 10/1970 | Hallman | 422/218 |
| 4,033,727 | 6/1977 | Vantrain | 422/218 |
| 4,098,041 | 7/1978 | Frye | 52/155 |

OTHER PUBLICATIONS

Diagram of Typical Radial Flow Reactor, Handout for ACE Eng. 811—Introduction to Petroleum Refinery Processes, 1-8-74, DCP RE 740228, pp. 3-17.

*Primary Examiner*—Joseph Scovronek
*Assistant Examiner*—Roger F. Phillips
*Attorney, Agent, or Firm*—D. A. Newell; R. H. Davies; M. K. Bosworth

[57] ABSTRACT

In an apparatus for contacting fluid with subdivided contact material, such as a radial-flow catalytic reactor, means having a substantially horizontal surface is attached to a lower portion of a vertically movable member within the reactor, the member being selected from center pipes and particle-retaining screens. The weight of contact material on the means restrains upward movement of the member during temperature cycling, and thus prevents problems caused by the upward movement.

10 Claims, 1 Drawing Figure

U.S. Patent        Jan. 13, 1981        4,244,922
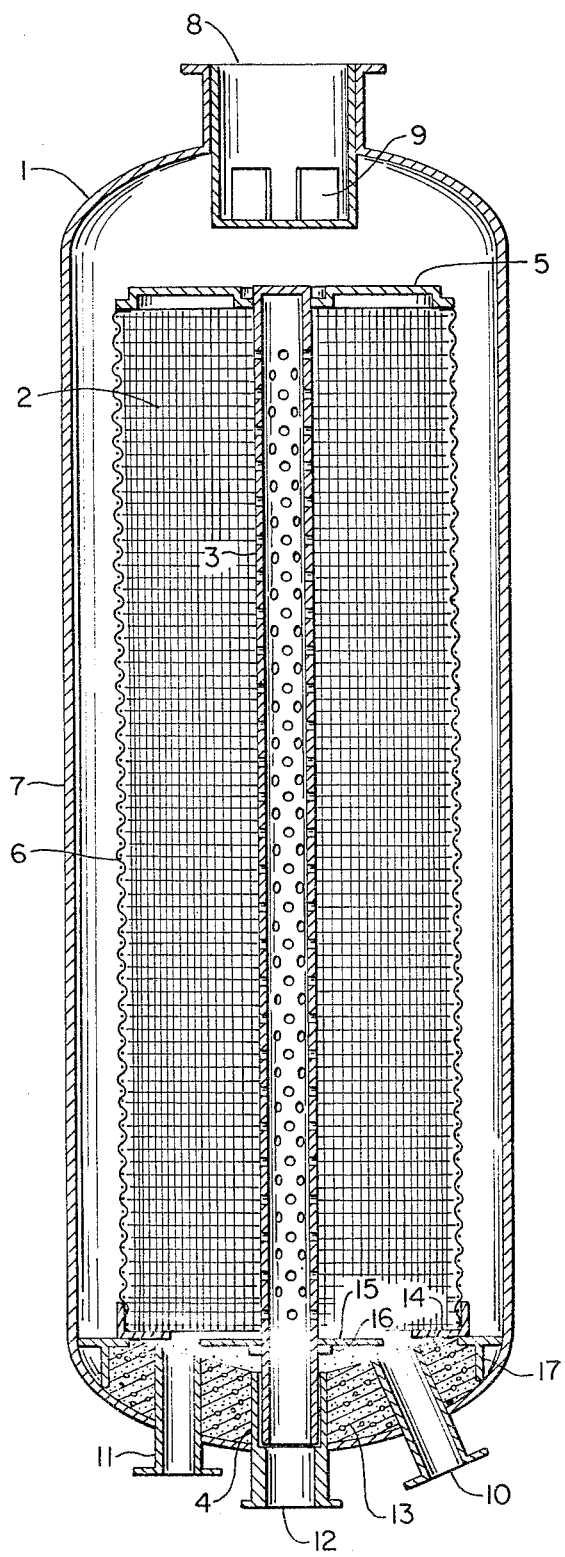

4,244,922

HOLD-DOWN DEVICE FOR VERTICALLY MOVABLE MEMBER IN APPARATUS WHICH CONTAINS CONTACT MATERIAL

FIELD OF THE INVENTION

This invention relates to an apparatus for contacting a fluid with a subdivided solid contact material. More specifically, this invention relates to a method and a device for restraining upward movement of vertically elongated members in such apparatus.

DESCRIPTION OF THE PRIOR ART

Conventional apparatus for contacting a fluid with a subdivided solid contact material, for example, radial flow vessels such as catalytic reactors, generally enclose a fixed bed of subdivided contact material. This bed of contact material is longitudinally traversed by a perforated center pipe and enclosed by a particle-retaining screen. The screen may be made up of segments having a scalloped appearance when viewed in transverse section, or it may be made up as a circular basket. The retaining screen is surrounded by the vessel wall, and the space between the retaining screen and the inner wall of the vessel serves as a longitudinal fluid flow path. The fluid reactant generally enters the top of the vessel, flows downwardly in the annular space between the retaining screen and the wall, passes inwardly through the bed to the center pipe and then leaves through an outlet at the bottom of the vessel. Alternatively, flow in the vessel may be inverted so that reactant enters the bottom of the vessel, flows upwardly in the annular space, passes through the bed and leaves through a center pipe communicating with an upper outlet.

Conventional apparatus are usually subjected to temperature cycling, an alternate increase and decrease in the temperature of the vessel and its contents. The cycles are frequently from 200° to 500° C. or more in magnitude. Temperature cycling occurs, for instance, when an apparatus is heated and brought into service at an elevated operating temperature and subsequently withdrawn from service and cooled. Temperature cycling also occurs when contact material in the vessel is regenerated at an elevated temperature, or when there is a feed or power shortage. Apparatus employed in catalytic hydrocarbon conversion processes such as reforming, isomerization, hydrodesulfurization and hydrocracking are especially subject to temperature cycling.

Radial flow vessels of conventional design have removable vertical members such as center pipes and contact-material retaining screens. The problem is that these members tend to move vertically upward in the bed of contact material with each temperature cycle. The reasons for the net upward movement are not completely understood. Apparently, the center pipe and retaining screen, upon being heated, expand in an upward direction. But upon being cooled, they contract from both ends toward an inner neutral point. Thus, with each cycle, there is a net upward movement, frequently up to 1 centimeter or more. Eventually the member will rise enough to allow unwanted movement of the contact material. In the case of the center pipe, when it moves away from the base of the vessel, contact material flows under it, escapes from the vessel and enters subsequent vessels. There the contact material can adversely affect fluid flow distribution or contacting efficiency. Upward movement of the retaining screen leads to a drop in the level of contact material as the contact material fills the space under the screen and between the screen and the vessel wall. Displacement of the catalyst obstructs flow of the reactant which can cause coking and damaging local temperature rises. The effect of both the drop in catalyst level and the rising of the center pipe is to decrease the depth of the contact material seal above the top row of perforations in the center pipe. The decreased seal allows some of the feed to bypass the contact material, which leads to loss of product quality.

SUMMARY OF THE INVENTION

The object of the invention is to provide a device and method for restraining upward vertical movement of members such as center pipes and contact material retaining screens in an apparatus when the apparatus is in operation, while permitting the members to be removed from the apparatus when it is withdrawn from operation.

In accordance with one embodiment of this invention, in an apparatus for contacting a fluid with subdivided contact material, the apparatus having (a) a vertically elongated vessel having fluid inlet and outlet passageways;
(b) a vertically elongated member, selected from perforate center pipes and perforate contact-material retaining means, axially located in the vessel, the lower end of the member being supported by the vessel at a lower portion of the vessel and the member being vertically movable with respect to the vessel;

there is provided an improvement which comprises means for restraining vertical movement of the member with respect to the vessel, said means being operably attached to a lower portion of said member and having a substantially horizontal surface adapted to receive at least a substantial portion of the force exerted by the contact material due to gravity.

Preferably, the restraining means is selected from flanges, annular sections of flanges, shelves, and feet.

Preferably, said restraining means is removably attached to the lower portion of the member. When the member is a center pipe, the restraining means preferably rests on and is supported by a support ring fixed to said center pipe beneath to the restraining means.

In accordance with another embodiment of the present invention, there is provided a method for restraining vertical movement during temperature cycles of a member selected from center pipes and perforate contact-material retaining means, which member is subjected to multiple temperature cycles, disposed in an apparatus for contacting a fluid with a subdivided solid contact material and vertically movable with respect to the apparatus; which method comprises restraining the member from vertical movement by supporting a substantial portion of the weight of the contact material with a substantially horizontal surface operably attached to a lower portion of the member.

Preferably, the surface is selected from flanges, annular sections of flanges, shelves and feet.

BRIEF DESCRIPTION OF THE FIGURE

The FIGURE is a partial sectional view of a reactor apparatus constructed in accordance with a preferred embodiment of the present invention.

DETAILED DESCRIPTION OF THE INVENTION

The present invention can best be understood by reference to the attached FIGURE. It will be understood that the invention is not thereby intended to be limited to the specific embodiment shown, and that the scope of the invention includes alternatives, modifications and equivalents of the depicted embodiment encompassed in the appended claims.

Referring now to the FIGURE, radial flow reactor 1 contains an annular fixed bed 2 of subdivided contact material longitudinally traversed by perforate center pipe 3 along the axis of the bed. If desired, center pipe 3 may be covered with a screening material. Center pipe 3 is supported at its lower end by socket 4 in the lower end of cylindrical vessel 7. The top of fixed bed 2 is covered by cover 5. The sides of the bed are supported and retained by screen material 6. Screen 6 rests upon support ring 17 and extends vertically within vessel 7 generally coextensively with the perforated length of center pipe 3. Although screen 6 may in its simplest form be cylindrical, forming with the wall of vessel 7 an annular longitudinal passageway, another commonly used construction for screen 6 is the "scalloped" screen arrangement in which the screen has a scalloped appearance when viewed in transverse section.

Fixed bed 2 and screen 6 enclosed by vessel 7, and the top of vessel 7 is provided with access manway 8. Inside manway 8 is a fluid inlet distributor 9 which is connected with the usual process piping outside of the reactor. At the bottom of the reactor, a conduit 10 may be provided for withdrawing subdivided contact material from bed 2, and a conduit 11 may be provided for sampling the contact material. An outlet passageway 12 communicating with the socket 4 for center pipe 3 is provided in vessel 7 for removing liquid effluent from the reactor. Concrete refractory material 13 is provided at the lower end of vessel 7. Refractory material may also be provided on the inside of cylindrical sidewalls of vessel 7.

Attached to a lower portion of screen 6 are feet 14 which project into bed 2 and are spaced apart from refractory material 13. Feet 14 support a portion of the weight of some of the contact material above them in bed 2. At a lower portion of center pipe 3, a disk-shaped flange 15 rests upon support ring 16 which is fixed to a lower portion of center pipe 3. Flange 15 supports a portion of the weight of some of the contact material above it in bed 2. The open space between feet 14 or flange 15 and refractory material 13 may be filled with a resilient filler material to keep the space free from contact material.

Other restraining means which may be used in place of feet or flanges include shelves or annular sections of flanges. Whichever restraining means is chosen, it should have a horizontally projecting surface for supporting at least a substantial portion of the weight of said contact material. A flange surrounds a member and may be of any suitable shape, for example, discoid, polygonal, rectangular, or irregular. An annular section of a flange only partially surrounds a member. A shelf is a horizontal projection, usually but not necessarily rectangular in shape. A foot is a shelf positioned at the lower end of a member.

The restraining means is operably attached to said member at a lower portion thereof. The restraining means may be releasably attached to the member, for example, by means such as bolts and screws, or when the restraining means is a flange, by resting it upon a support ring fixed to the member just underneath the flange. Alternatively, the restraining means may be permanently attached to said member by such methods as welding, if such is desired. When the member is a center pipe, it is preferable for the restraining means to be releasably attached.

The substantially horizontal portion of the restraining means should be adapted to receive at least a substantial portion of the force exerted by gravity on the contact material. A "substantial portion of the force exerted by gravity" is sufficient force to counterbalance the force causing upward movement of the member. The surface area necessary to receive this force will vary, depending upon such factors as the service to which the apparatus is put, particle depth, density, and the angle of repose, which in turn depends upon particle size and shape. The surface area needed for a particular member may be determined readily by calculation or experiment. A representative area of the restraining means surface may vary from 0.005 to 0.1 times the surface area of said member in contact with the contact material, and preferably the range is from 0.015 to 0.04.

The weight of the contact material on the restraining means of the present invention acts to countermand upward vertical movement of the member. The restraining means of the present invention apparently acts as an anchor which forces the neutral point (point of no movement) of the member to remain at or very near the same location during thermal expansion as during contraction and thereby prevents net movement of the member. This explanation is not considered definitive, only illustrative, and Applicants do not wish to be bound by it.

EXAMPLE

The following example is a comparison between a reactor of traditional design and one which employs the hold-down device of the present invention.

A radial flow catalytic reforming reactor has a removable center pipe 57 cm (22.5 inches) outside diameter and a removable scalloped particle-retaining screen, each section ("scallop") of which is approximately 25 cm (10 inches) across and 10 cm (4 inches) wide at the ends. The scallops are supported by a scallop support cylinder at the lower end of the reactor. The center pipe is supported by a 9 cm (3.5 inch) deep, slightly tapered socket at the lower end of the reactor. The reactor contains a fixed bed of extruded catalyst having a 1.6 mm (1/16 inch) nominal diameter, a 6 mm ($\frac{1}{4}$ inch) average length, an apparent bulk density of about 0.6 grams per cc and a depth of 8.2 meters (27 feet).

The reactor was placed in service and while in service was subjected to a number of thermal cycles of up to 500° C. (900° F.). After nine months in operation, the reactor was removed from service and inspected. The center pipe was found to have risen out of its socket, causing a loss of almost two tons of catalyst. The scallops were found to have risen from 18 to 23 cm (7 to 9 inches), allowing catalyst to fill the space between the scallops and the vessel wall, thus causing a further decrease in the level of the catalyst bed. The cover plate over the catalyst was jammed in place by the center pipe and scallops at 5 to 12.7 cm (2 to 5 inches) above its normal level, preventing an inspection of the vessel interior until the catalyst was removed.

The following modifications are made to the reactor: (A) a support ring 70 cm (27.5 inches) outside diameter and 1.26 cm (½ inch) thick is welded to the center pipe at a location about 2 cm (¾ inch) above the top of the socket. A flange having an inside diameter of 65 cm (25.6 inches), an outside diameter of 107 cm (42 inches) and a thickness of 2.5 cm (1 inch) is placed on the supporting ring; (B) at the bottom of each scallop, at the side facing the catalyst bed, a foot having the following dimensions is welded: 46 cm (18 inches) long, about 23 cm (9 inches) wide and 3.8 cm (1½ inches) thick. The foot has a slight taper in the direction of the center pipe.

The reactor is placed into service, and withdrawn from service after a number of temperature cycles have taken place. Upon inspection of the reactor, no apparent upward movement of either the scallops or the center pipe is found. Thus, the restraining means of the present invention prevents unwanted upward movement during thermal cycles of a member in an apparatus filled with contact material.

Although only specific arrangements and modes of construction and operation of the present invention have been described and illustrated, numerous changes could be made in those arrangements and modes without departing from the spirit of this invention. All such changes that fall within the scope of the appended claims are intended to be embraced thereby.

What is claimed is:

1. In radial flow reactor for contacting a fluid with a subdivided solid contact material, said apparatus having:
    (a) a vertically elongated vessel having fluid inlet and outlet passageways;
    (b) a vertically elongated perforate center member and a perforate outer contact-material retaining means, axially located in said vessel, the lower end of said member and retaining means being supported by said vessel at a lower portion of said vessel and said member and retaining means being vertically movable with respect to said vessel;
the improvement which comprises means for restraining vertical movement of said member or outer retaining means with respect to said vessel, said means being operably attached to a lower portion of said member or outer retaining means and having a substantially horizontal surface adapted to receive at least a substantial portion of force exerted by gravity on the contact material.

2. The apparatus of claim 1 wherein said restraining means is a flange or a foot.

3. The apparatus of claim 1 wherein said surface has an area from 0.005 to 0.1 times the surface area of said member or retaining means in contact with the contact material.

4. The apparatus of claim 1 wherein said surface has an area from 0.015 to 0.04 times the surface area of said member or retaining means in contact with the contact material.

5. The apparatus of claim 1 wherein said member is a center pipe, further comprising a support ring fixed to said center pipe beneath said restraining means.

6. The apparatus of claim 1 wherein and said subdivided solid contact material is a catalyst.

7. The apparatus of claim 1 wherein said member is a center pipe and the lower end of said center pipe is supported by an axial socket means fixed to the lower end of said vessel.

8. A method for preventing vertical movement during temperature cycles of a vertically elongated perforate center member or a perforate outer contact-material retaining means, said member and retaining means being subjected to multiple temperature cycles, disposed in a radial flow reactor for contacting a fluid with a subdivided solid contact material and vertically movable with respect to said reactor, which method comprises restraining said member or retaining means from movement by supporting a substantial portion of the weight of said contact material with a substantially horizontal surface operably attached to a lower portion of said member or retaining means.

9. The method of claim 8 wherein said surface is a flange or a foot.

10. The method of claim 8 wherein said temperature cycles have a range of at least 139° C. (250° F.).

* * * * *